United States Patent
Kokaki et al.

(10) Patent No.: US 11,059,481 B2
(45) Date of Patent: Jul. 13, 2021

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Toru Kokaki, Wako (JP); Katsuya Yashiro, Wako (JP); Toshiyuki Kaji, Wako (JP); Masanori Takeda, Wako (JP); Hiroshi Oguro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 16/496,973

(22) PCT Filed: Mar. 31, 2017

(86) PCT No.: PCT/JP2017/013666
§ 371 (c)(1),
(2) Date: Sep. 24, 2019

(87) PCT Pub. No.: WO2018/179359
PCT Pub. Date: Oct. 4, 2018

(65) Prior Publication Data
US 2020/0377083 A1    Dec. 3, 2020

(51) Int. Cl.
*B60W 30/095*  (2012.01)
*B60W 60/00*   (2020.01)
*G06K 9/00*    (2006.01)

(52) U.S. Cl.
CPC .... *B60W 30/0956* (2013.01); *B60W 60/0015* (2020.02); *B60W 60/0053* (2020.02); *G06K 9/00805* (2013.01); *B60W 2520/06* (2013.01)

(58) Field of Classification Search
CPC .......... G06K 9/00805; B60W 2554/20; B60W 30/0956
See application file for complete search history.

(56) References Cited

U.S. PATENT DOCUMENTS

| 10,926,818 B1* | 2/2021 | Sasu ........................ B60K 1/04 |
| 2003/0043031 A1* | 3/2003 | Nowottnick ........ B60C 23/0416 340/438 |

(Continued)

FOREIGN PATENT DOCUMENTS

| JP | 2002-096750 | 4/2002 |
| JP | 2003-154961 | 5/2003 |

(Continued)

OTHER PUBLICATIONS

International Search Report and Written Opinion for International Application Serial No. PCT/JP2017/013666 dated Jul. 4, 2017, 7 pages.

*Primary Examiner* — Ryan Rink
(74) *Attorney, Agent, or Firm* — Amin, Turocy & Watson, LLP

(57) ABSTRACT

A vehicle control system includes: a recognizer that recognizes a distribution state of obstacles in an advancement direction of a vehicle; a trajectory determiner that determines a target trajectory for each vehicle wheel of the vehicle on the basis of the distribution state of the obstacles recognized by the recognizer; and an automated driving controller that executes automated driving of the vehicle along the target trajectory determined by the trajectory determiner.

8 Claims, 11 Drawing Sheets

(56) References Cited

U.S. PATENT DOCUMENTS

| | | | | |
|---|---|---|---|---|
| 2007/0021886 | A1* | 1/2007 | Miyajima | B60G 17/019 |
| | | | | 701/37 |
| 2014/0160276 | A1* | 6/2014 | Pliefke | B62D 13/06 |
| | | | | 348/118 |
| 2015/0203112 | A1* | 7/2015 | Duncan | B60W 30/0956 |
| | | | | 701/1 |
| 2015/0274158 | A1* | 10/2015 | Fujita | B62D 15/025 |
| | | | | 701/23 |
| 2015/0336607 | A1* | 11/2015 | Inoue | B60W 40/114 |
| | | | | 701/41 |
| 2016/0129736 | A1* | 5/2016 | Peine | B60C 19/00 |
| | | | | 701/32.3 |
| 2016/0297432 | A1* | 10/2016 | Fletcher | B60D 1/36 |
| 2017/0166204 | A1* | 6/2017 | Yoo | B62D 15/0265 |
| 2017/0322560 | A1* | 11/2017 | Zhang | G06K 9/00805 |
| 2019/0009719 | A1* | 1/2019 | Kondo | B60R 1/00 |
| 2019/0031234 | A1* | 1/2019 | Schall | B62D 7/1509 |
| 2019/0193725 | A1* | 6/2019 | Suzuki | B60W 30/06 |
| 2019/0270478 | A1* | 9/2019 | Kim | B62D 7/1509 |
| 2020/0231210 | A1* | 7/2020 | Anderson | B62D 6/001 |
| 2020/0239074 | A1* | 7/2020 | Loveall | B62D 15/0295 |
| 2020/0307569 | A1* | 10/2020 | Yasui | B60W 60/00274 |
| 2020/0346690 | A1* | 11/2020 | Maruoka | B62D 13/06 |
| 2020/0406999 | A1* | 12/2020 | Corbett | B62K 11/007 |
| 2020/0407013 | A1* | 12/2020 | Corbett | B62M 6/50 |

FOREIGN PATENT DOCUMENTS

| | | |
|---|---|---|
| JP | 2014-078056 | 5/2014 |
| JP | 2014-093018 | 5/2014 |
| WO | 2015-166721 | 11/2015 |
| WO | 2017-018192 | 2/2017 |

* cited by examiner

| 160A | FEATURE QUANTITY | TYPE | SHAPE | ... |
|---|---|---|---|---|
| | F001 | PET BOTTLE | HEIGHT:A WIDTH:a | ... |
| | F002 | CARDBOARD | HEIGHT:B WIDTH:b | ... |
| | F003 | PLATE | HEIGHT:C WIDTH:c | ... |
| | F004 | ANIMAL | HEIGHT:D WIDTH:d | ... |
| | F005 | PUDDLE | HEIGHT:E WIDTH:e | ... |
| | F006 | CABBAGE | HEIGHT:F WIDTH:f | ... |
| | F007 | CRACK | HEIGHT:G WIDTH:g | ... |
| | ... | ... | ... | ... |

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

In recent years, automated driving of vehicles has been researched. In relation to this, technologies for performing automated driving control of vehicles based on driving operations represented by operation history information using operation history information associating driving operations performed by a driver with places at which the driving operations are performed have been disclosed (for example, see Patent Literature 1).

CITATION LIST

Patent Literature

Patent Literature 1

PCT Publication No. 2015/166721

SUMMARY OF INVENTION

Technical Problem

However, in a technique of a conventional technology, in a case in which a sudden event, for example, an obstacle such as a fallen object or the like covering all lanes, occurs, there are cases in which a driving operation based on operation history information cannot be executed, and automated driving cannot be executed.

The present invention is in consideration of such situations, and one object thereof is to provide a vehicle control system, a vehicle control method, and a vehicle control program capable of continuing automated driving while avoiding an obstacle.

Solution to Problem

According to an aspect, there is provided a vehicle control system including: a recognizer that recognizes a distribution state of obstacles in an advancement direction of a vehicle; a trajectory determiner that determines a target trajectory for each vehicle wheel of the vehicle on the basis of the distribution state of the obstacles recognized by the recognizer; and an automated driving controller that executes automated driving of the vehicle along the target trajectory determined by the trajectory determiner.

According to another aspect, in the vehicle control system, the trajectory determiner determines a target trajectory for each vehicle wheel of the vehicle within a lane in which the vehicle is currently running.

According to another aspect, in the vehicle control system, in a case in which the target trajectory for each vehicle wheel of the vehicle cannot be determined within the lane in which the vehicle is currently running, the trajectory determiner determines the target trajectory by allowing a deviation from the lane in which the vehicle is currently running.

According to another aspect, in the vehicle control system, an estimator that estimates types of obstacles recognized by the recognizer is further included, and the trajectory determiner determines the target trajectory for each vehicle wheel of the vehicle on the basis of the types of the obstacles estimated by the estimator.

According to another aspect, in the vehicle control system, the automated driving controller performs control of stopping the vehicle in a case in which the target trajectory for each vehicle wheel of the vehicle cannot be determined on the basis of a predetermined criterion by the trajectory determiner.

According to another aspect, in the vehicle control system, the automated driving controller performs control of switching to manual driving according to a vehicle occupant of the vehicle in a case in which the target trajectory for each vehicle wheel of the vehicle cannot be determined on the basis of a predetermined criterion by the trajectory determiner.

According to another aspect, there is provided a vehicle control method using an in-vehicle computer including: recognizing a distribution state of obstacles in an advancement direction of a vehicle; determining a target trajectory for each vehicle wheel of the vehicle on the basis of the recognized distribution state of the obstacles; and executing automated driving of the vehicle along the determined target trajectory.

According to another aspect, there is provided a non-transitory computer-readable storage medium that stores a vehicle control program to be executed by an in-vehicle computer to perform at least: recognizing a distribution state of obstacles in an advancement direction of a vehicle; determining a target trajectory for each vehicle wheel of the vehicle on the basis of the recognized distribution state of the obstacles; and executing automated driving of the vehicle along the determined target trajectory.

Advantageous Effects of Invention

According to another aspect, a vehicle can continue automated driving while avoiding an obstacle.

According to another aspect, a vehicle can continue automated driving while appropriately avoiding an obstacle by configuring a target trajectory for each vehicle wheel.

According to another aspect, the continuity of automated driving can be further improved by increasing a degree of freedom of moving in a horizontal direction.

According to another aspect, in a case in which an obstacle cannot be avoided, a vehicle can continue automated driving while securing the safety of a vehicle occupant by straddling or overstepping an obstacle through estimation of a type of obstacle.

According to another aspect, a vehicle can improve the safety of a vehicle occupant.

According to another aspect, running according to determination of a vehicle occupant can be realized.

DESCRIPTION OF EMBODIMENTS

Hereinafter, a vehicle control system, a vehicle control method, and a vehicle control program according to embodiments of the present invention will be described with reference to the drawings. In the embodiments, a vehicle control system is applied to an automated driving vehicle. Automated driving, for example, is driving a vehicle by automatedly controlling at least one of acceleration/deceleration and steering of a vehicle.

Entire Configuration

Figure 1:
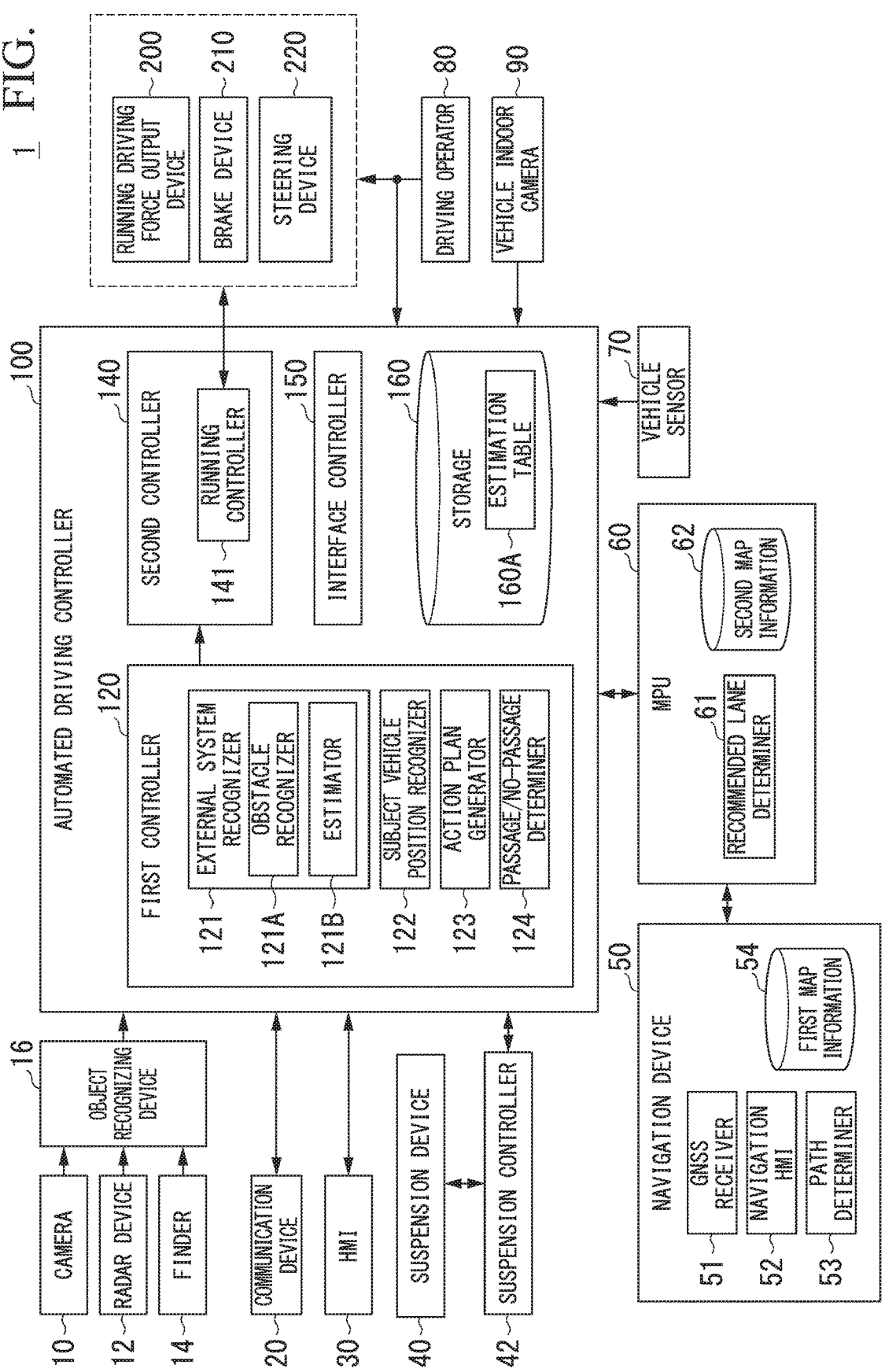
FIG. 1 is a configuration diagram of a vehicle system including an automated driving controller according to an embodiment.

FIG. 1 is a configuration diagram of a vehicle system 1 including an automated driving controller 100. A vehicle in which the vehicle system 1 is mounted (hereinafter, referred to as a vehicle M) is, for example, a vehicle having two wheels, three wheels, four wheels, or the like, and a driving source thereof is an internal combustion engine such as a diesel engine or a gasoline engine, an electric motor, or a combination thereof. An electric motor operates using power generated using a power generator connected to an internal combustion engine or discharge power of a secondary cell or a fuel cell.

The vehicle system 1, for example, includes a camera (imaging unit) 10, a radar device 12, a finder 14, an object recognizing device 16, a communication device 20, a human machine interface (HMI) 30, a suspension device 40, a suspension controller 42, a navigation device 50, a microprocessing unit (MPU) 60, a vehicle sensor 70, a driving operator 80, a vehicle indoor camera 90, an automated driving controller 100, a running driving force output device 200, a brake device 210, and a steering device 220. Such devices and units are interconnected using a multiplex communication line such as a controller area network (CAN) communication line, a serial communication line, a radio communication network, or the like. In addition, the configuration illustrated in FIG. 1 is merely one example, and thus, some components may be omitted, and, furthermore, another component may be added thereto. A "vehicle control system", for example, includes an obstacle recognizer 121A, an estimator 121B, an action plan generator 123, and a passage/no-passage determiner 124.

The camera 10, for example, is a digital camera using a solid-state imaging device such as a charge coupled device (CCD) or a complementary metal oxide semiconductor (CMOS). One or a plurality of cameras 10 are installed at arbitrary places in the vehicle M. In a case in which a front side is to be imaged, the camera 10 is installed at an upper part of a front windshield, a rear face of a rear-view mirror, or the like. In a case in which a rear side is to be imaged, the camera 10 is installed to an upper part of a rear wind shield, a back door, or the like. In a case in which a lateral side is to be images, the camera 10 is installed to a door mirror or the like. The camera 10, for example, periodically images the vicinity of the vehicle M repeatedly. The camera 10 may be a stereo camera. In addition, the camera 10 may be an omnidirectional camera that can image omni-directions (360°) with respect to the horizontal direction of the vehicle M.

The radar device 12 emits radiowaves such as millimeter waves to the vicinity of the vehicle M and detects at least a position of (a distance to and an azimuth of) an object by detecting radiowaves (reflected waves) reflected by the object. One or a plurality of radar devices 12 are installed at arbitrary places in the vehicle M. The radar device 12 may detect a position and a speed of an object using a frequency modulated continuous wave (FM-CW) system.

The finder 14 is a light detection and ranging or a laser imaging detection and ranging (LIDAR) finder that detects a distance to a target by measuring light scattered from emitted light. One or a plurality of finders 14 are installed at arbitrary places in the vehicle M.

The object recognizing device 16 may perform a sensor fusion process on results of detection using some or all of the camera 10, the radar device 12, and the finder 14, thereby recognizing a position, a type, a speed, and the like of an object. The object recognizing device 16 outputs a result of recognition to the automated driving controller 100.

The communication device 20, for example, communicates with nearby vehicles present in the vicinity of the vehicle M using a cellular network, a Wi-Fi network, Bluetooth (registered trademark), dedicated short range communication (DSRC), or the like or communicates with various server apparatuses through a radio base station.

The HMI 30 presents various types of information to a vehicle occupant of the vehicle M and receives an input operation performed by a vehicle occupant. The HMI 30 includes various display devices, a speaker, a buzzer, a touch panel, a switch, a key, and the like.

The suspension device 40, for example, includes a mechanism that performs positioning of a vehicle axis, a mechanism that supports a vehicle weight and absorbs a shock from a road surface or the like for the vehicle M, and a mechanism that attenuates vibrations generated in accompaniment with the shock. The suspension device 40, for example, is an air suspension formed by enclosing gas inside a container of elastomer or the like formed in a bag shape. In addition, the suspension device 40 may be a hydraulic suspension using oil or the like. Furthermore, the suspension device 40 may be formed by combining an elastic body such as a spring or the like. In addition, the suspension device 40 may be used for adjusting a minimum under clearance of the vehicle M. The minimum under clearance, for example, is a height from a ground surface of a horizontal road to a lowest point of the vehicle body.

The suspension controller 42 controls an air pressure, a hydraulic pressure, and the like of the suspension device 40 on the basis of a target trajectory generated by the action plan generator 123, thereby controlling a degree of buffering for a shock. Details of the function of the suspension controller 42 will be described later.

The navigation device 50, for example, includes a global navigation satellite system (GNSS) receiver 51, a navigation HMI 52, and a path determiner 53 and stores first map information 54 in a storage device such as a hard disk drive (HDD) or a flash memory. The GNSS receiver identifies a position of a vehicle M on the basis of signals received from GNSS satellites. The position of the vehicle M may be identified or complemented by an inertial navigation system (INS) using an output of the vehicle sensor 70. The navigation HMI 52 includes a display device, a speaker, a touch panel, a key, and the like. A part or the whole of the navigation HMI 52 and the HMI 30 described above may be configured to be shared. The path determiner 53, for example, determines a path from a location of the vehicle M identified by the GNSS receiver 51 (or an input arbitrary location) to a destination input by a vehicle occupant using the navigation HMI 52 by referring to the first map information 54. The first map information 54, for example, is information in which a road form is represented by respective links representing a road and respective nodes connected using the links. The first map information 54 may include a curvature of each road, point of interest (POI) information, and the like. The path determined by the path determiner 53 is output to the MPU 60. The navigation device 50 may perform path guide using the navigation HMI 52 on the basis of the path determined by the path determiner 53. The navigation device 50, for example, may be realized by a function of a terminal device such as a smartphone, a tablet terminal, or the like held by a user. The navigation device 50 may transmit a current position and a destination to a navigation server through the communication device 20 and acquire a path transmitted from the navigation server in response thereto.

The MPU 60, for example, functions as a recommended lane determiner 61 and maintains second map information 62 in a storage device such as an HDD or a flash memory. The recommended lane determiner 61 divides a path provided from the navigation device 50 into a plurality of blocks (for example, divides the path into blocks of 100 [m] in the advancement direction of the vehicle) and determines a recommended lane for each block by referring to the second map information 62. The recommended lane determiner 61 determines a lane from the left side in which the vehicle will run. In a case in which there is a branching point, a merging point, or the like in the path, the recommended lane determiner 61 determines a recommended lane such that the vehicle M can run along a reasonable running path for advancement to a branch destination.

The second map information 62 is map information having an accuracy higher than that of the first map information 54. The second map information 62, for example, includes information of the center of respective lanes, information on boundaries between lanes, or the like. In addition, in the second map information 62, road information, traffic regulations information, address information (address and zip code), facilities information, telephone information, and the like may be included. In the road information, information representing a type of road such as an expressway, a toll road, a national road, or a prefectural road and information such as the number of lanes of a road, an emergency parking area, a width of each lane, a gradient of a road, a position of a road (three-dimensional coordinates including longitude, latitude, and a height), a curvature of the curve of a lane, locations of merging and branching points of lanes, a sign installed on a road, and the like are included. The second map information 62 may be updated as necessary by accessing another device using the communication device 20.

The vehicle sensor 70 includes a vehicle speed sensor detecting a speed of the vehicle M, an acceleration sensor detecting an acceleration, a yaw rate sensor detecting an angular velocity around a vertical axis, an azimuth sensor detecting a direction of the vehicle M, and the like. In addition, the vehicle sensor 70 includes a brake malfunction detecting sensor that detects deterioration and the like of a brake actuator of the brake device 210 and an air pressure sensor that detects whether or not the air pressure of tires during running is equal to or lower than a threshold, and the like.

The driving operator 80, for example, includes an acceleration pedal, a brake pedal, a shift lever, a steering wheel, and other operators. A sensor detecting the amount of an operation or the presence/absence of an operation is installed in the driving operator 80, and a result of detection thereof is output to the automated driving controller 100 or the running driving force output device 200 or one or both of the brake device 210 and the steering device 220.

The vehicle indoor camera 90 images an upper half body of a vehicle occupant sitting on a driver's seat with the face disposed at the center. A captured image acquired by the vehicle indoor camera 90 is output to the automated driving controller 100.

Automated Driving Controller

The automated driving controller 100, for example, includes a first controller 120, a second controller 140, an interface controller 150, and a storage 160. Each of the first controller 120, the second controller 140, and the interface controller 150 to be described later is realized by a processor such as a central processing unit (CPU) executing a program (software). Some or all of the functional units of the first controller 120, the second controller 140, and the interface controller 150 may be realized by hardware such as a large scale integration (LSI), an application specific integrated circuit (ASIC), a field-programmable gate array (FPGA), or the like or may be realized by software and hardware in cooperation.

In addition, a combination of the first controller 120 and the second controller 140 is one example of an "automated driving controller."

The first controller 120, for example, includes an external system recognizer 121, a subject vehicle position recognizer 122, an action plan generator 123, and a passage/no-passage determiner 124. A combination of the external system recognizer 121 and an obstacle recognizer 121A to be described later is one example of a "recognizer." In addition, the action plan generator 123 is one example of a "trajectory determiner." Furthermore, the passage/no-passage determiner 124 may be included in the action plan generator 123.

The external system recognizer 121 recognizes states of nearby vehicles such as positions, speeds, and accelerations on the basis of information input from the camera 10, the radar device 12, and the finder 14 through the object recognizing device 16. The position of a nearby vehicle may be represented as a representative point of the nearby vehicle such as the center of gravity, a corner, or the like and may be represented by an area represented by the contour of the nearby vehicle. The "state" of a nearby vehicle may include an acceleration or a jerk or an "action state" (for example, the vehicle is changing lanes or is about to change lanes) of the nearby vehicle. In addition, the external system recognizer 121 may recognize positions of a guard rail, a telegraph pole, a road mark, and other objects in addition to nearby vehicles.

In addition, the external system recognizer 121, for example, includes an obstacle recognizer 121A and an estimator 121B. The obstacle recognizer 121A recognizes an obstacle in the advancement direction of the vehicle M among nearby objects recognized by the external system recognizer 121. The term "obstacle" broadly refers to physical tangible objects and intangible objects that disturb run of the vehicle M. A tangible object, for example, is a fallen object that falls from a vehicle during running or a fallen object that falls from a suspension object such as a tunnel or a bridge. In addition, a tangible object may be a vehicle that has stopped or rolled over on a road. Furthermore, a tangible object may be a construction site on a road or the like. In addition, a tangible object may be a pedestrian, an animal such as a cat or a dog, or the like that has entered a road. Furthermore, a tangible object may be a puddle or a snowdrift on a road, a crack or a level difference on the road, or the like. An intangible product, for example, is a hole or a sink of a road. An obstacle may be referred to as an "obstacle object" or may be referred to as an "obstacle event." For example, in a case in which the size of an object present in the advancement direction is equal to or larger than a predetermined size, the obstacle recognizer 121A may recognize the object as an obstacle. In addition, the obstacle recognizer 121A recognizes a distribution of obstacles in the advancement direction of the vehicle M. Details of the function of the obstacle recognizer 121A will be described later.

The estimator 121B estimates one or both of the type and the shape of an obstacle recognized by the obstacle recognizer 121A. Details of the function of the estimator 121B will be described later.

The subject vehicle position recognizer 122, for example, recognizes a lane in which the vehicle M is running (a running lane) and a relative position and a posture of the vehicle M with respect to the running lane. The subject vehicle position recognizer 122 recognizes a running lane, for example, by comparing a pattern (for example, an array of a solid line and a broken line) of a road partition line that is acquired from the second map information 62 with a pattern of the road partition line in the vicinity of the vehicle M that is recognized from an image captured by the camera 10. In this recognition, the position of the vehicle M acquired from the navigation device 50 and a processing result acquired using the INS may also be taken into account.

Figure 2:
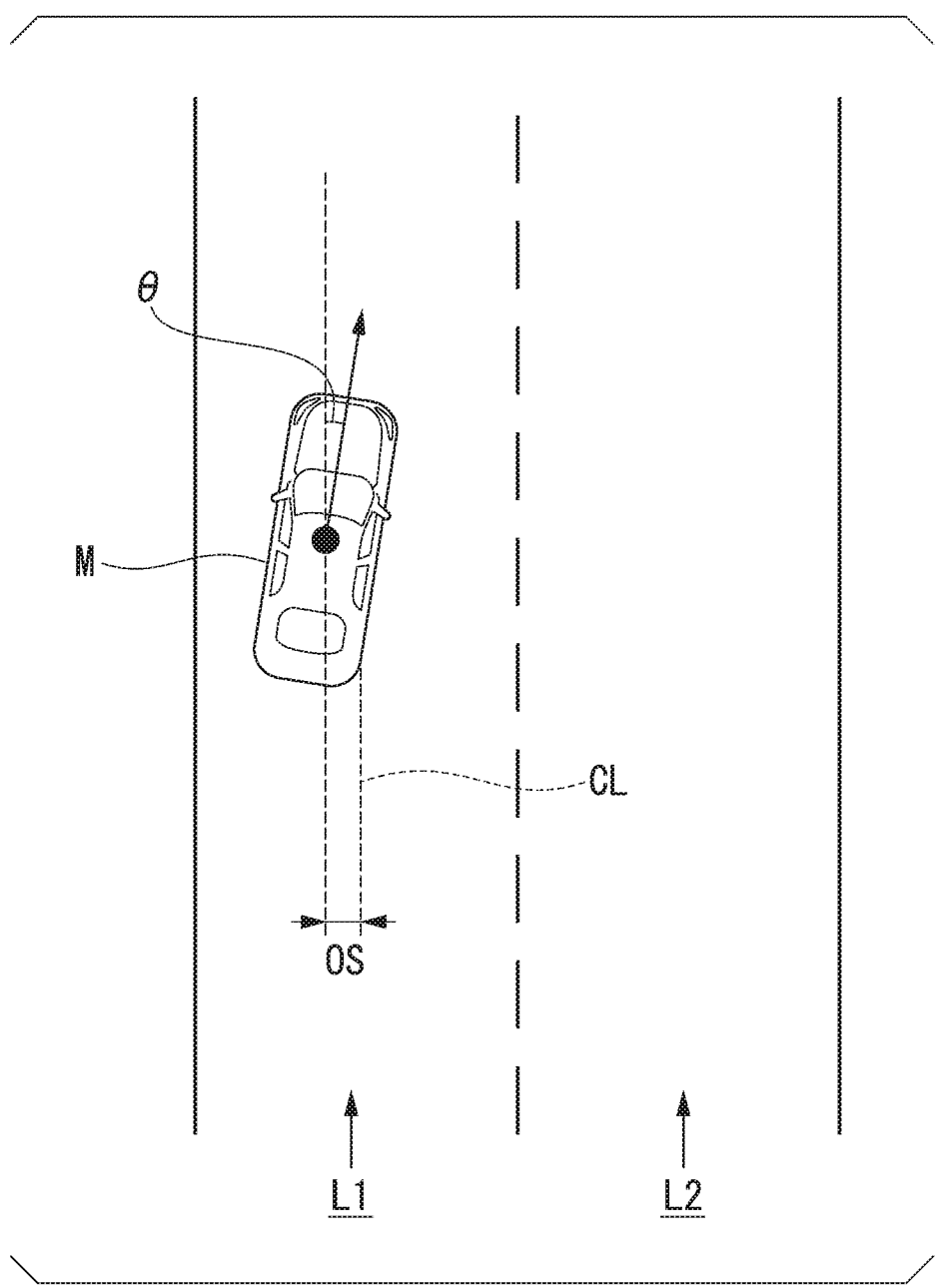
FIG. 2 is a diagram illustrating a view in which a relative position and a posture of a vehicle with respect to a running lane are recognized by a subject vehicle position recognizer.

Then, the subject vehicle position recognizer 122, for example, recognizes a position and a posture of the vehicle M with respect to the running lane. FIG. 2 is a diagram illustrating a view in which a relative position and a posture of a vehicle M with respect to a running lane L1 are recognized by the subject vehicle position recognizer 122. The subject vehicle position recognizer 122, for example, recognizes an offset OS of a reference point (for example, a center of gravity) of the vehicle M from the running lane center CL and an angle θ of an advancement direction of the vehicle M formed with a line acquired by aligning the running lane center CL as a relative position and a posture of the vehicle M with respect to the running lane L1. In addition, instead of this, the subject vehicle position recognizer 122 may recognize a position of the reference point of the vehicle M with respect to one side end of the running lane L1 or the like as a relative position of the vehicle M with respect to the running lane. The relative position of the vehicle M recognized by the subject vehicle position recognizer 122 is provided for the recommended lane determiner 61 and the action plan generator 123.

The action plan generator 123 generates an action plan for the vehicle M to perform automated driving toward a destination and the like. For example, the action plan generator 123 determines events to be sequentially executed in automated driving such that the vehicle runs in a lane determined as a recommended lane by the recommended lane determiner 61 and responds to a surrounding status of the vehicle M. As the events, for example, there are a constant-speed running event in which the vehicle runs at a constant speed in the same running lane, a following running event in which the vehicle runs behind a preceding vehicle, a lane changing event, a merging event, a branching event, an urgent stopping event, a switching event for ending automated driving and switching to manual driving, and the like. In addition, during the execution of such events, there are also cases in which an action for avoidance is planned on the basis of surrounding situations of the vehicle M (the presence of an obstacle, lane narrowing due to road construction, and the like).

The action plan generator 123 generates a target trajectory along which the vehicle M will run in the future. A target trajectory is represented by sequentially aligning points (trajectory points) to be reached by the vehicle M. A trajectory point is a point to be reached by the vehicle M for every predetermined running distance, and a target speed and a target acceleration for every predetermined sampling time (for example, several tenths of a [sec]) are generated as a part of the target trajectory in addition thereto. In addition, a trajectory point may be a position to be reached by the vehicle M at a sampling time for every predetermined sampling time. In such a case, information of target speeds and target accelerations is represented at the interval of trajectory points.

Figure 3:
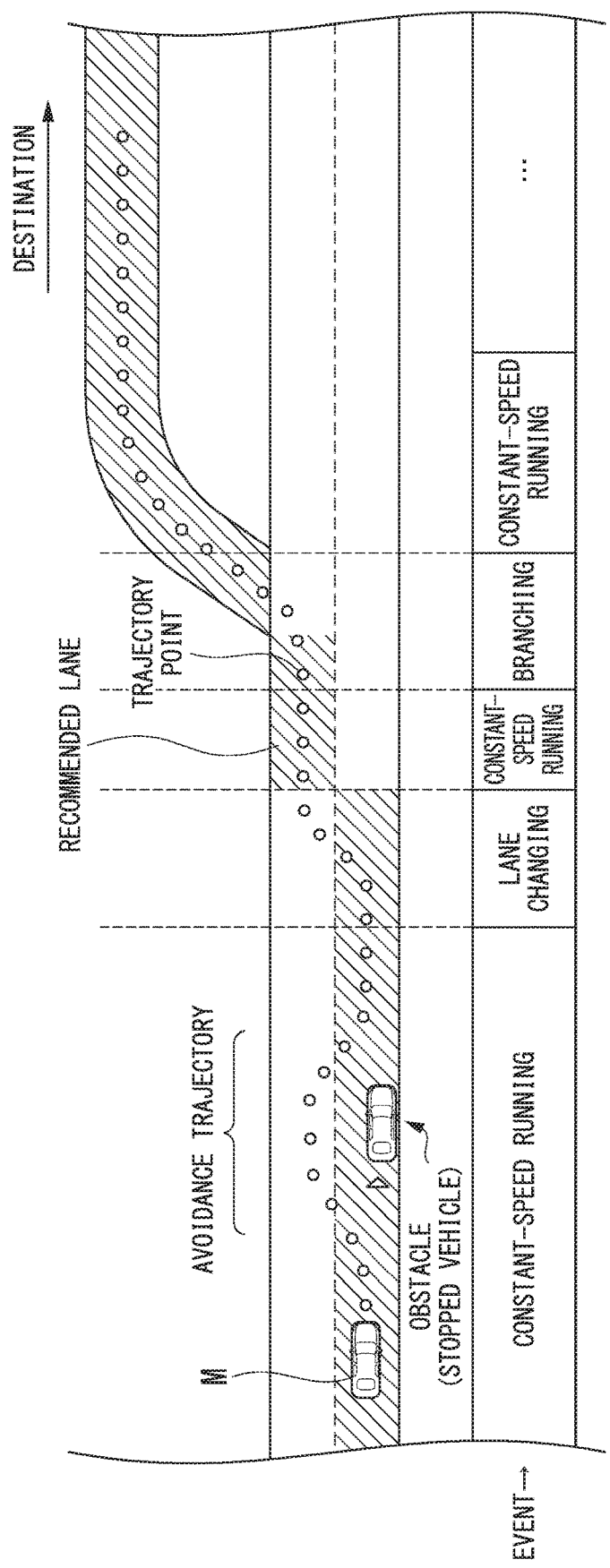
FIG. 3 is a diagram illustrating a view in which a target trajectory is generated on the basis of a recommended lane.

FIG. 3 is a diagram illustrating a view in which a target trajectory is generated on the basis of a recommended lane. As illustrated in the drawing, the recommended lane is determined such that it is convenient for the vehicle to run along a path to a destination. When the vehicle reaches a position a predetermined distance before a recommended lane switching point (which may be determined in accordance with a type of event), the action plan generator 123 starts the lane changing event, the branching event, the merging event, or the like. In a case in which there is a need to avoid an obstacle during the execution of each event, for example, as illustrated in the drawing, an avoidance trajectory may be generated.

The action plan generator 123, for example, generates a plurality of candidates for a target trajectory and selects an optimal target trajectory that is optimal at that time point in view of safety and efficiency.

For example, the action plan generator 123, for example, determines a target trajectory of the vehicle M on the basis of a result of determination performed by the passage/no-passage determiner 124 to be described later. For example, in a case in which it is determined by the passage/no-passage determiner 124 that passage can be performed, the action plan generator 123 determines a target trajectory for avoiding the obstacle or passing with the obstacle overstepped. In addition, in a case in which it is determined by the passage/no-passage determiner 124 that passage cannot be performed, the action plan generator 123 determines a target trajectory for urgently stopping.

The passage/no-passage determiner 124 determines whether or not passage in which an obstacle is avoided or overstepped can be performed on the basis of at least one of the type and the shape of the obstacle estimated by the estimator 121B. The passage/no-passage determiner 124 outputs a result of the determination relating to passage/no-passage to the action plan generator 123. Details of the function of the passage/no-passage determiner 124 will be described later.

The second controller 140, for example, includes a running controller 141. The running controller 141 controls the running driving force output device 200, the brake device 210, and the steering device 220 such that the vehicle M passes through a target trajectory generated by the action plan generator 123 at a scheduled time.

The interface controller 150 controls information output to the HMI 30. In addition, the interface controller 150 acquires information received by the HMI 30.

The storage 160 is a storage device such as a hard disk drive (HDD), a flash memory, a random access memory (RAM), or a read only memory (ROM). For example, an estimation table 160A is stored in the storage 160. Details of the estimation table 160A will be described later.

The running driving force output device 200 outputs a running driving force (torque) for causing a vehicle M to run to driving wheels. The running driving force output device 200, for example, includes a combination of an internal combustion engine, an electric motor, a transmission gear, and the like and an ECU controlling these. The ECU controls the components described above in accordance with information input from the running controller 141 or information input from the driving operator 80.

The brake device 210, for example, includes a brake caliper, a cylinder delivering hydraulic pressure to the brake caliper, an electric motor generating hydraulic pressure in the cylinder, and a brake ECU. The brake ECU controls the electric motor on the basis of the information input from the running controller 141 or the information input from the driving operator 80 such that a brake torque corresponding to a braking operation is output to each vehicle wheel. The brake device 210 may include a mechanism that delivers a hydraulic pressure generated in accordance with an operation of a brake pedal included in the driving operator 80 to the cylinder through a master cylinder as a backup. The brake device 210 is not limited to the configuration described above and may be an electronic-control-type hydraulic brake device that delivers a hydraulic pressure of the master cylinder to the cylinder by controlling a hydraulic actuator on the basis of information input from the running controller 141. The brake device 210 may include a plurality of systems of brake devices in consideration of safety.

The steering device 220, for example, includes a steering ECU and an electric motor. The electric motor, for example, changes the direction of the steering wheel by applying a force to a rack and pinion mechanism. The steering ECU changes the direction of the steering wheel by driving the electric motor in accordance with information input from the running controller 141 or information input from the driving operator 80.

Automated Driving Control According to Obstacle

Hereinafter, automated driving control according to an obstacle will be described. A vehicle M according to an embodiment, for example, determines a target trajectory of each vehicle wheel of the vehicle M on the basis of a distribution state of obstacles recognized in the advancement direction and executes automated driving along the determined target trajectory.

Figure 4:
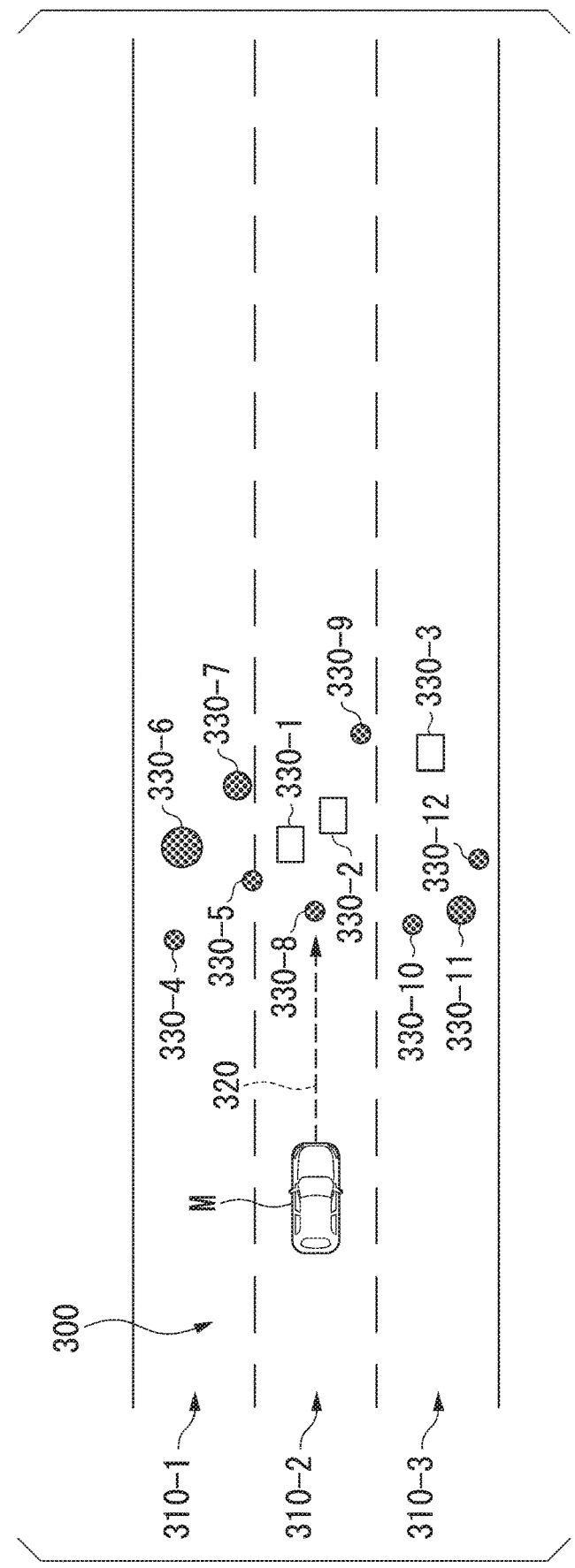
FIG. 4 is a diagram illustrating a view of obstacles present in an advancement direction of a vehicle.

FIG. 4 is a diagram illustrating a view of obstacles present in an advancement direction of a vehicle M. There are three lanes 310-1 to 310-3 on a road 300 illustrated in FIG. 4. The action plan generator 123 causes the vehicle M to run along the target trajectory 320 generated on the basis of a running path to a destination through automated driving.

The obstacle recognizer 121A, for example, recognizes objects 330-1 to 330-12 (hereinafter, when objects do not need to be particularly differentiated, they are simply referred to as "objects 330") that are present in the advancement direction of the vehicle M as obstacles. The function of this embodiment is particularly effective in a case in which there are many obstacles. As an example in which there are many obstacles on a road, there are a case in which many goods loaded in a cargo bed of a preceding vehicle are scattered on a road due to roll-over, a collision, or the like of preceding vehicles, a case in which parts, broken pieces, or the like of a preceding vehicle are scattered, and the like. In addition, as another example, there are a case in which fallen objects that have fallen from an upper structure such as a tunnel or a bridge are scattered, a case in which a plurality of cracks or holes are formed due to a sink or the like of a road, a case in which many puddles are formed after heavy rain, and the like.

In addition, the obstacle recognizer 121A recognizes a distribution state of each obstacle. A distribution state may include not only a position of an obstacle but also information such as a size, a height, a degree of risk, and the like thereof.

In addition, a distribution state may be a ratio of an area occupied by an obstacle to a unit area of a road. In such a case, the obstacle recognizer 121A calculates a ratio of an area occupied by objects 330 to a unit area of a road. In addition, the obstacle recognizer 121A may calculate a ratio of an area occupied by obstacles 330 for a lane 310-2 in which the vehicle M is running and lanes 310-1 and 310-3 other than the running lane for each of the lanes 310-1 to 310-3. The above-described ratio of an area occupied by objects 330 is used as one determination condition for the passage/no-passage determiner 124.

The action plan generator 123 determines a target trajectory in which passage can be performed without contact with an obstacle or a target trajectory in which there is no influence on the run of the vehicle M even in a case in which the vehicle comes in contact with an obstacle on the basis of a distribution of obstacles recognized by the obstacle recognizer 121A. In this case, the action plan generator 123 determines a target trajectory on the basis of a result of determination of passage/no-passage determined for each vehicle wheel of the vehicle M by the passage/no-passage determiner 124. In this way, the vehicle M can continue automated driving while appropriately avoiding obstacles.

Figure 5:
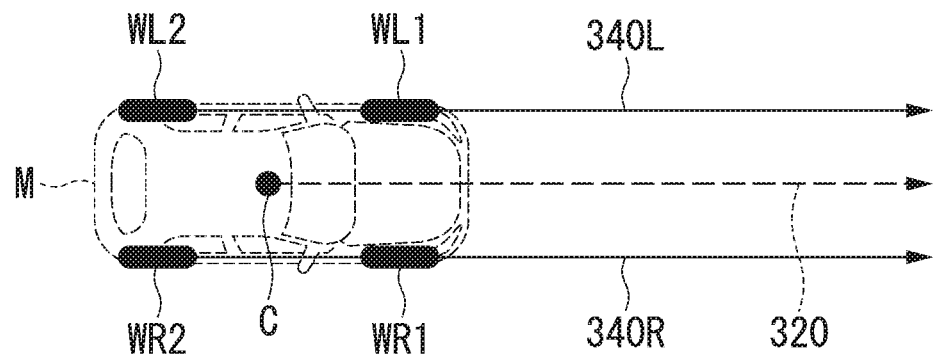
FIG. 5 is a diagram illustrating one example of a target trajectory for each vehicle wheel of a vehicle.

FIG. 5 is a diagram illustrating one example of a target trajectory for each vehicle wheel of a vehicle M. In the example illustrated in FIG. 5, the vehicle M includes four vehicle wheels WL1, WL2, WR1, and WR2. While the action plan generator 123 determines a target trajectory 320 with reference to the center or the center of gravity of the vehicle M, in a case in which an obstacle is detected, the action plan generator 123 generates a target trajectory with reference to the positions of the vehicle wheels WL1, WL2, WR1, and WR2 set in advance. In this case, the action plan generator 123 calculates target loci 340L and 340R of left and right vehicle wheels with respect to a target trajectory 320 with reference to the center C, for example, on the basis of distances and directions of the vehicle wheels WL1, WL2, WR1, and WR2 from the center C of the vehicle M.

Figure 6:
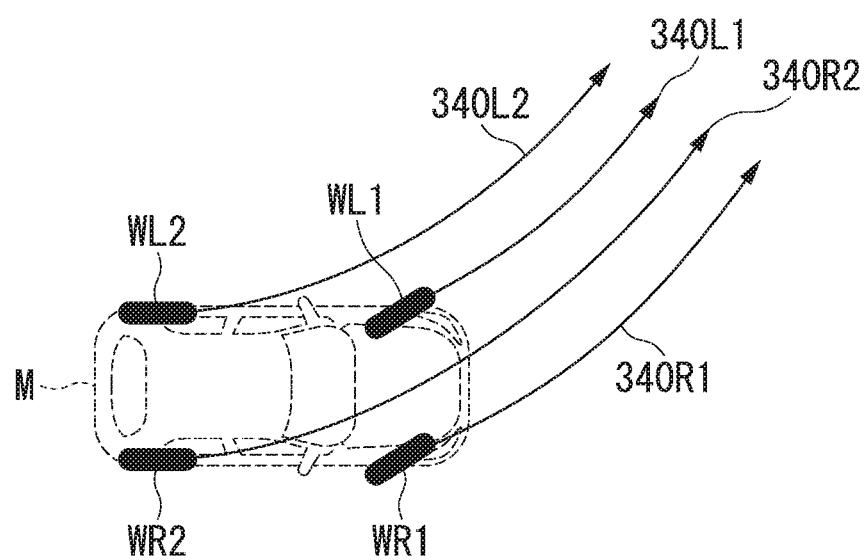
FIG. 6 is a diagram illustrating one example of a target trajectory of each vehicle wheel based on steering of a vehicle.

FIG. 6 is a diagram illustrating one example of a target trajectory of each vehicle wheel based on steering of a vehicle M. In a case in which the vehicle M changes the advancement direction through steering, an inner wheel difference and an outer wheel difference occur in the running paths of front wheels and rear wheels of the vehicle M. Accordingly, the action plan generator 123 determines a target trajectory in which none of the vehicle wheels WL1, WL2, WR1, and WR2 come into contact with objects 330 or a target trajectory in which there is no influence on the run of the vehicle M even in a case in which the wheels do come into contact with obstacles. In this case, the action plan generator 123 determines a target trajectory in which a relative position and a relative angle of each vehicle wheel are associated.

Figure 7:
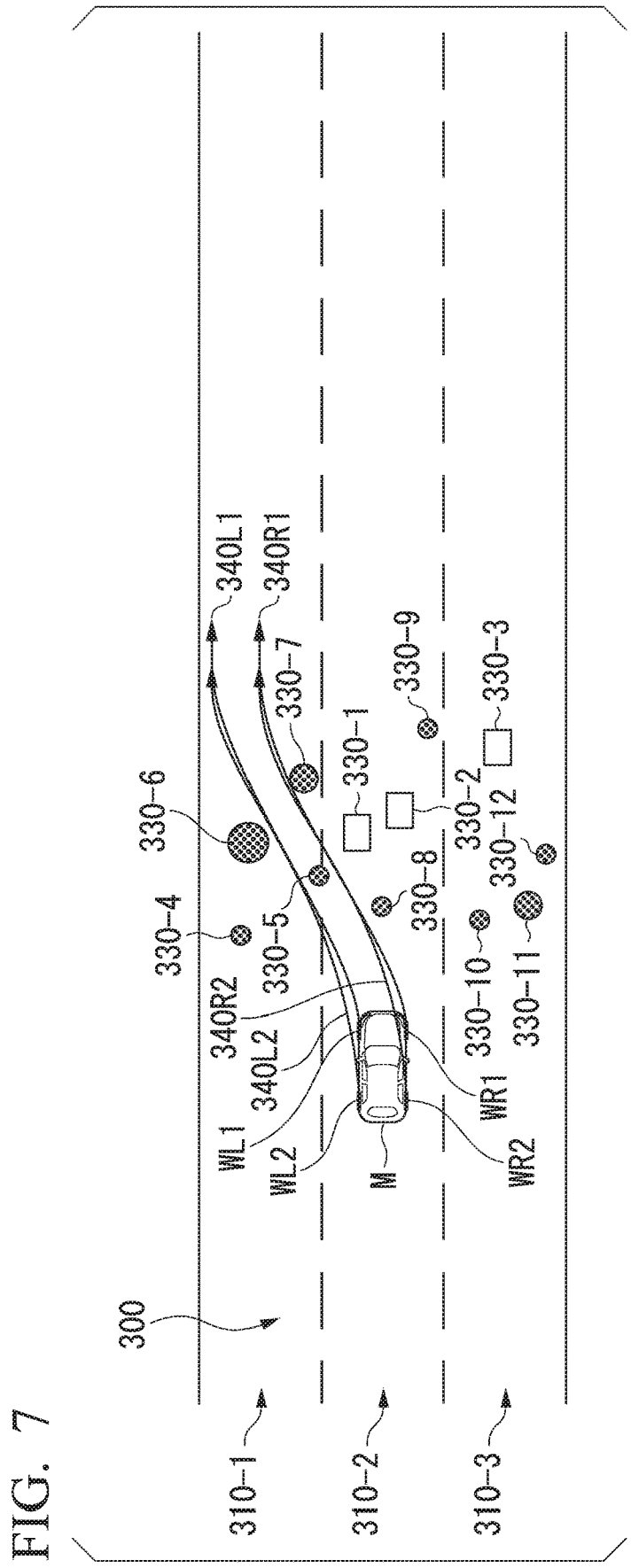
FIG. 7 is a diagram illustrating a view of a target trajectory avoiding an object 330.

FIG. 7 is a diagram illustrating a view of a target trajectory avoiding an object 330. The action plan generator 123 respectively determines target loci 340L1, 340L2, 340R1, and 340R2 for vehicle wheels WL1, WL2, WR1, and WR2 of a vehicle M. Then, the action plan generator 123 executes automated driving along the target loci 340L1, 340L2, 340R1, and 340R2 that have been determined.

Specific Example in which Target Trajectory Corresponding to Obstacle is Determined Next, a specific example of determination of target loci corresponding to obstacles will be described. The estimator 121B estimates a type of object on the basis of feature quantities acquired in the process of recognition of objects 330 recognized by the obstacle recognizer 121A. A feature quantity of an object 330, for example, is a feature quantity extracted on the basis of information input from the camera 10, the radar device 12, and the finder 14 through the object recognizing device 16. The feature quantity, for example, includes at least one of a feature quantity acquired from an entire image captured by the camera 10, a feature quantity acquired from an edge, an edge pattern, or the like of an object 330, a feature quantity acquired from shading, hue, and a color histogram of an object 330, and a feature quantity acquired from the shape and the size of an object 330. In addition, the feature quantity may be a feature quantity associated with a position and a speed of an object acquired from the radar device 12. Furthermore, the feature quantity may be a feature quantity associated with the position of an object acquired from the finder 14.

The estimator 121B extracts feature quantities of an object 330 using some or all of such feature quantities. In addition, the estimator 121B estimates a type of an object 330 for the extracted feature quantities. For example, the estimator 121B acquires a type of object 330 corresponding to a feature quantity on the basis of extracted feature quantities by referring to the estimation table 160A stored in the storage 160.

Figures 8, 9:
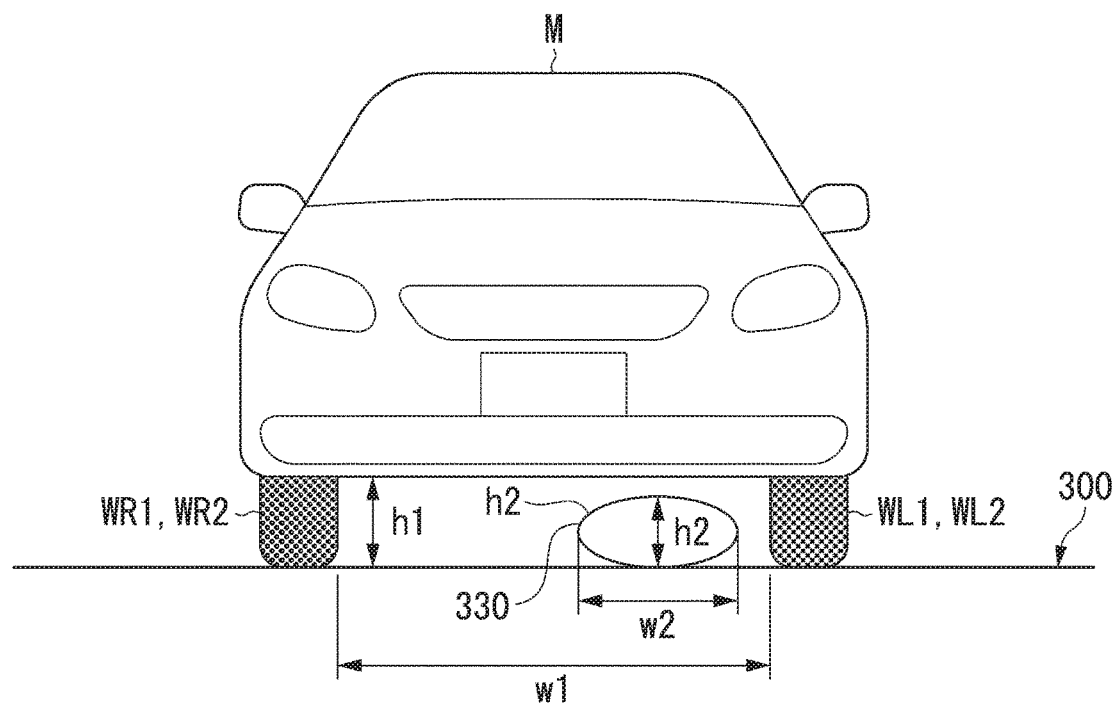
FIG. 8 is a diagram illustrating one example of an estimation table.
FIG. 9 is a diagram illustrating a view of determination of passage/no-passage.

FIG. 8 is a diagram illustrating one example of an estimation table 160A. The estimation table 160A, for example, is information in which a type and a shape are associated with each feature quantity. The type is information used for identifying a type of object. The shape, for example, is a height and a width of an object 330 when the object 330 is seen in the advancement direction of the vehicle M.

The passage/no-passage determiner 124 determines whether or not the vehicle can pass through each object 330 on the basis of at least one of the type and the shape of an object 330 estimated by the estimator 121B and information relating to the shape of the vehicle M. The information relating to the shape of the vehicle M, for example, is at least one of a vehicle width of the vehicle M, a minimum under clearance, a width between left and right wheels of the vehicle M, a size of each vehicle wheel, a size of the vehicle body, and the like. The information relating to the shape of the vehicle M is stored in the storage 160. In addition, an object can be passed through, for example, represents that the vehicle can run while avoiding the object 330, the vehicle can pass with the object 330 straddled, or the vehicle can run with the object 330 overstepped. The vehicle passing with the object 330 avoided represents that vehicle runs such that left and right vehicle wheels of the vehicle M pass one of left and right sides of the object 330. In addition, the vehicle running with the object 330 straddled, for example, represents that the vehicle runs with the vehicle wheels of the vehicle M passing through the left and right sides of the object 330 such that the vehicle body passes above the object 330.

FIG. 9 is a diagram illustrating a view of determination of passage/no-passage. In the example illustrated in FIG. 9, a vehicle M running on a road 300 and an object 330 in a running path of the vehicle M are illustrated. The passage/no-passage determiner 124 compares a width w1 between left and right vehicle wheels and a minimum under clearance h1 of the vehicle M stored in the storage 160 in advance with a width w2 and a height h2 of an obstacle estimated by the estimator 121B.

For example, in a case in which the height of the object 330 is larger than the minimum under clearance h1, the passage/no-passage determiner 124 determines whether or not passage with the object 330 avoided can be performed. In this case, the passage/no-passage determiner 124 determines whether or not the object 330 can be avoided within a lane 310-2 in which the vehicle M is currently running. In this way, there is no disturbance of nearby vehicles running in different lanes, and accordingly, congestion and the like due to a lane change can be inhibited. In a case in which there is a width in which the vehicle M can pass with the object 330 avoided within the lane 310-2, the passage/no-passage determiner 124 determines that passage with the object 330 avoided can be performed.

In addition, in a case in which there is no width in which the vehicle M can pass with the object 330 avoided within the lane 310-2, the passage/no-passage determiner 124 determines that passage with the object 330 avoided cannot be performed. In a case in which it is determined that the object 330 cannot be avoided in the lane 310-2, the passage/no-passage determiner 124 determines whether the object 330 can be avoided for each vehicle wheel by allowing a deviation from the lane 310-2. In this way, the degree of freedom of moving in the horizontal direction is improved, and the continuity of automated driving can be further improved. In addition, in a case in which a deviation from the lane 310-2 is allowed, the passage/no-passage determiner 124 may determine passage/no-passage by prioritizing a lane in which the ratio of an area occupied by objects 330 to unit area of the road surface is low out of the lanes 310-1 and 310-3 other than the passage running lane. In this way, a passable path can be effectively derived.

In addition, in a case in which a width w2 of the object 330 is smaller than the vehicle wheel width w1, and the height h2 of the object 330 is smaller than the minimum under clearance h1, the passage/no-passage determiner 124 determines that passage with the object 330 straddled can be performed.

In addition, in a case in which the object 330 is a soft object such as a PET bottle, the passage/no-passage determiner 124 determines that passage with the object 330 straddled can be performed. In addition, in a case in which the type of object 330 is a cardboard or the like, the passage/no-passage determiner 124 may determine whether or not a content of the cardboard is vacant or the like. In such a case, the passage/no-passage determiner 124, for example, extracts a degree of deformation of the object 330 from a predetermined shape (rectangular parallelepiped) stored in the estimation table 160A and an actual shape of the object 330 acquired from an image captured by the camera 10 and determines that the content of the object 330 is vacant in a case in which the extracted degree of deformation is equal to or larger than a threshold. In addition, the passage/no-passage determiner 124 may cause the radar device 12 to emit an X ray or the like to the object 330 and determine whether or not the content of the object 330 is vacant on the basis of information acquired through the emission. Then, the passage/no-passage determiner 124 may determine that passage with the object 330 overstepped can be performed in a case in which the content of the object 330 is determined to be vacant. In this way, for example, even in a case in which the height h2 of the object 330 is larger than the minimum under clearance h1 of the vehicle M, the object 330 can be overstepped.

Figure 10:
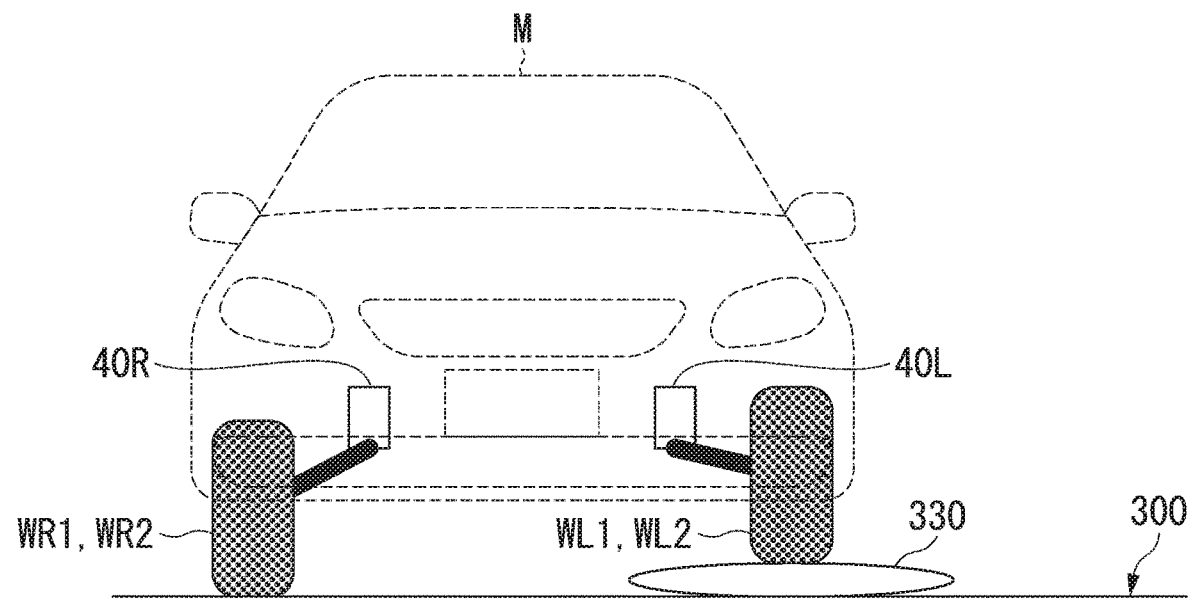
FIG. 10 is a diagram illustrating a view of a vehicle M running with an object overstepped.

FIG. 10 is a diagram illustrating a view of a vehicle M running with an object 330 overstepped. The example illustrated in FIG. 10 schematically illustrates an independent suspending-type suspension in which the left and right vehicle wheels WR and WL of the vehicle M independently operate. The vehicle M includes suspension devices 40L and 40R respectively corresponding to the left and right vehicle wheels WR and WL. The suspension devices 40L and 40R are controlled by the suspension controller 42. By using the independent suspending-type suspension, even in a case in which one side of the left and right vehicle wheels is moved, there is no influence on the other side, and accordingly, the performance of the suspension of each of the left and right sides can be improved.

Figure 11:
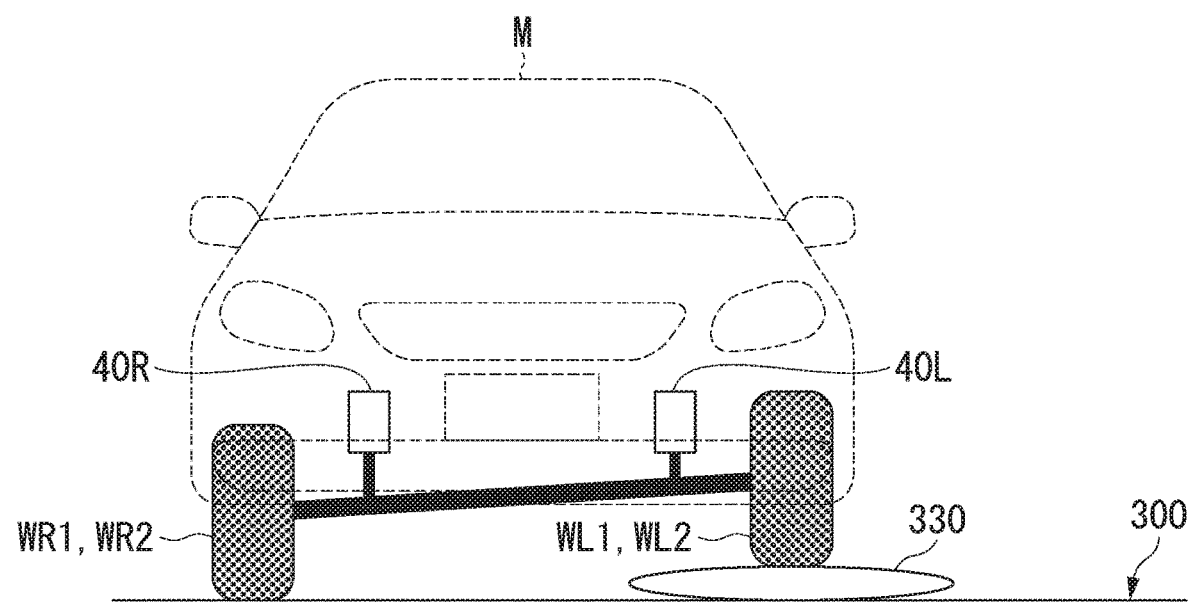
FIG. 11 is a diagram illustrating an axle suspending-type suspension.

In addition, in an embodiment, an axle suspending-type suspension may be used instead of the independent suspending-type suspension. FIG. 11 is a diagram illustrating an axle suspending-type suspension. In the axle suspending-type suspension illustrated in FIG. 11, left and right vehicle wheels WR and WL are connected using a vehicle shaft. The axle suspending-type suspension, compared to the independent suspending-type suspension, has a simple structure and can be manufactured at low cost. Also in such a case, the left and right suspension devices 40L and 40R are controlled by the suspension controller 42.

In a case in which it is determined by the passage/no-passage determiner 124 that the vehicle M can overstep the object 330, and a target trajectory for overstepping the object 330 is generated, the suspension controller 42 controls the degrees of buffering using the suspension devices 40L and 40R before overstepping (for example, a distance from the object 330 is within a predetermined distance) or during overstepping the object 330. For example, the suspension controller 42 controls an air pressure or a hydraulic pressure of the suspension device 40 corresponding to wheels overstepping the object 330 and increases the degree of buffering immediately before overstepping the object 330 or during overstepping the object 330. In addition, the suspension controller 42 may control the degree of buffering of each vehicle wheel at a timing at which the front wheels or the rear wheels of the vehicle M overstep the object 330.

In the example illustrated in FIGS. 10 and 11, the left vehicle wheels WL1 and WL2 of the vehicle M overstep the object 330. Accordingly, the suspension controller 42 controls the air pressure or the hydraulic pressure of the suspension device 40L corresponding to the left vehicle wheels WL1 and WL2. Accordingly, vibrations generated when the vehicle M oversteps the object 330 can be inhibited, and the vehicle body can be horizontally maintained.

In addition, in a case in which the object 330 is overstepped by the left and right vehicle wheels, the suspension controller 42 may increase the degrees of buffering of the left and right suspension devices 40L and 40R. In addition, the suspension controller 42 may perform control such that the degrees of buffering of the suspension devices 40L and 40R are different in accordance with the shape or the like of the object 330.

In addition, in a case in which the vehicle runs with the object 330 overstepped, the action plan generator 123 may perform control relating to acceleration/deceleration of the vehicle M in accordance with an action plan. In such a case, the action plan generator 123, for example, performs deceleration control from a predetermined distance before overstepping the obstacle. Accordingly, a shock at the time of overstepping the object 330 is alleviated, or slipping and the like in a state in which the vehicle runs on the object 330 can be inhibited. In addition, the action plan generator 123 may perform acceleration control up to the original speed after overstepping the object 330.

In addition, the action plan generator 123 may perform acceleration control until the speed of the vehicle M becomes equal to or higher than a predetermined speed in a case in which the speed of the vehicle M is equal to or lower than a threshold. By accelerating the vehicle M, the object 330 can be easily overstepped.

In addition, the action plan generator 123 may perform control relating to steering of the vehicle in accordance with an action plan in a case in which the vehicle runs with the object 330 overstepped. In such a case, for example, the action plan generator 123 performs control of fixing the steering in a state in which the vehicle overstepping the obstacle. Accordingly, in accordance with steering control in a state in which the vehicle runs over the object 330, phenomena such as a slipping of the vehicle M and jumping of the object 330 due to vehicle wheels 330 being stepped off and the like can be inhibited.

In addition, in the state in which the vehicle M is overstepping the object 330, the interface controller 150 may control a sound output from the speaker of the HMI 30. For example, in the state in which the vehicle M is overstepping the object 330, by outputting a sound from the speaker, the interface controller 150 may cause a sound generated in accordance with the overstepping of the object 330 not to be heard by a vehicle occupant. In addition, the interface controller 150 may cause the speaker to output a sound set for each type of object 330. In this way, the vehicle occupant can identify a type of the object 330 that has been overstepped without seeing the object.

In addition, for example, in a case in which the type of the object 330 is a sharp object or an animal or in a case in which the height h2 of the object 330 is larger than the minimum under clearance h1 of the vehicle M, the passage/no-passage determiner 124 determines that passage with the object 330 overstepped cannot be performed. In such a case, the action plan generator 123 generates an action plan for running with the object 330 avoided. The running with an object avoided includes a case in which the vehicle runs with the object 330 straddled, a case in which the vehicle runs with the object 330 avoided within the same lane as the running lane, and a case in which the vehicle runs with the object 330 avoided by changing the lane to a different lane.

Figure 12:
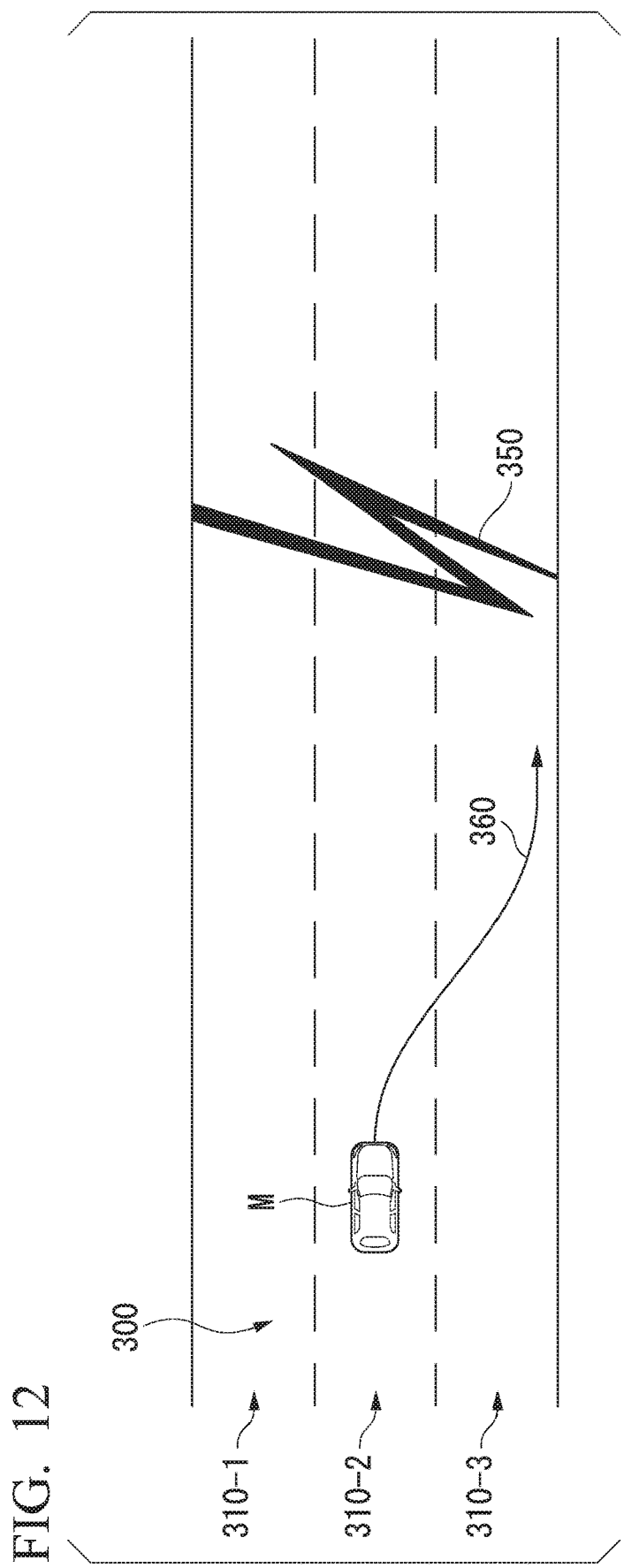
FIG. 12 is a diagram illustrating a view of urgently stopping of a vehicle.

In addition, in a case in which it is determined by the passage/no-passage determiner 124 that an obstacle cannot be passed, the action plan generator 123 generates a target trajectory for urgently stopping the vehicle M at a safe position. FIG. 12 is a diagram illustrating a view of urgently stopping a vehicle M. In the example illustrated in FIG. 12, an obstacle 350 through which the vehicle cannot pass such as cracks is illustrated on a road 300 on which the vehicle M is running. The passage/no-passage determiner 124 determines whether the vehicle can pass with the obstacle 350 avoided or whether or not the vehicle can pass with the obstacle 350 overstepped on the basis of the type, the shape, and the like acquired from the feature quantities of the obstacle 350. In addition, in a case in which it is determined that passage cannot be performed, the action plan generator 123, as illustrated in FIG. 12, generates a target trajectory 360 for urgently stopping by pulling the vehicle over at any one of both sides of the road of the vehicle M. In this way, the vehicle M can improve the safety of a vehicle occupant.

Figure 13:
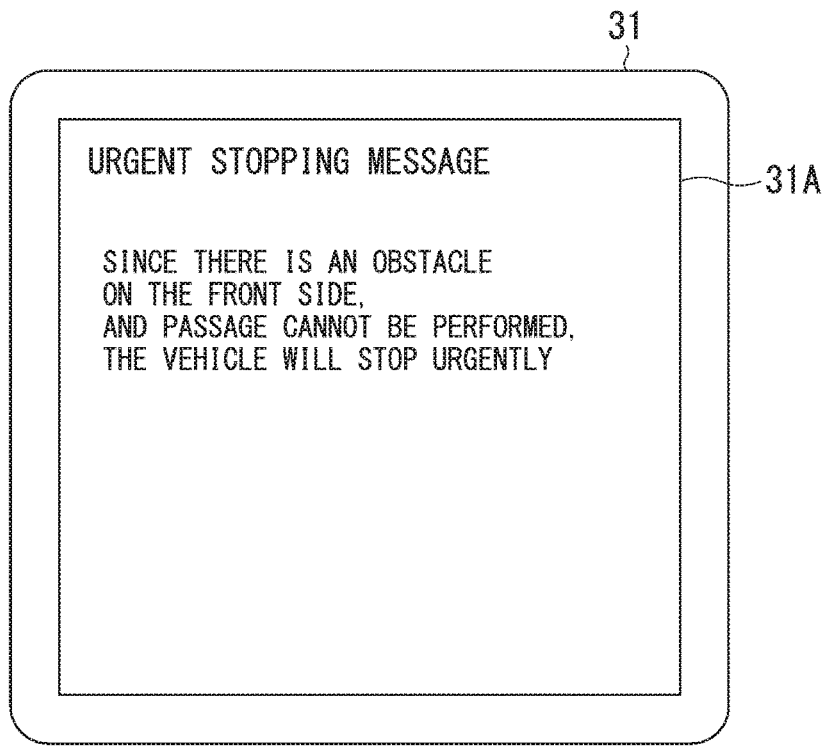
FIG. 13 is a diagram illustrating one example of details presented to a vehicle occupant at the time of urgent stopping.

In addition, in a case in which urgent stopping of the vehicle M described above is performed, the interface controller 150 may present an indication representing urgent stopping to a vehicle occupant using the HMI 30. FIG. 13 is a diagram illustrating one example of details presented to a vehicle occupant at the time of urgent stopping. In a case in which the action plan generator 123 generates a target trajectory 360 for urgent stopping, and automated driving according to the generated target trajectory is executed, the interface controller 150 causes the display device 31 of the HMI 30 to display an urgent stopping message screen 31A. As the urgent stopping message, for example, as illustrated in FIG. 13, a message "Since there is an obstacle on the front side, and passage cannot be performed, the vehicle will stop urgently" or the like is output but is not limited thereto. In addition, the interface controller 150 may output a voice similar to the urgent stopping message from the speaker of the HMI 30. The interface controller 150 may remove the urgent stopping message screen 31A after display for a predetermined time or may remove the urgent stopping message screen in a case in which there is a predetermined switching operation or the like from a vehicle occupant.

Figure 14:
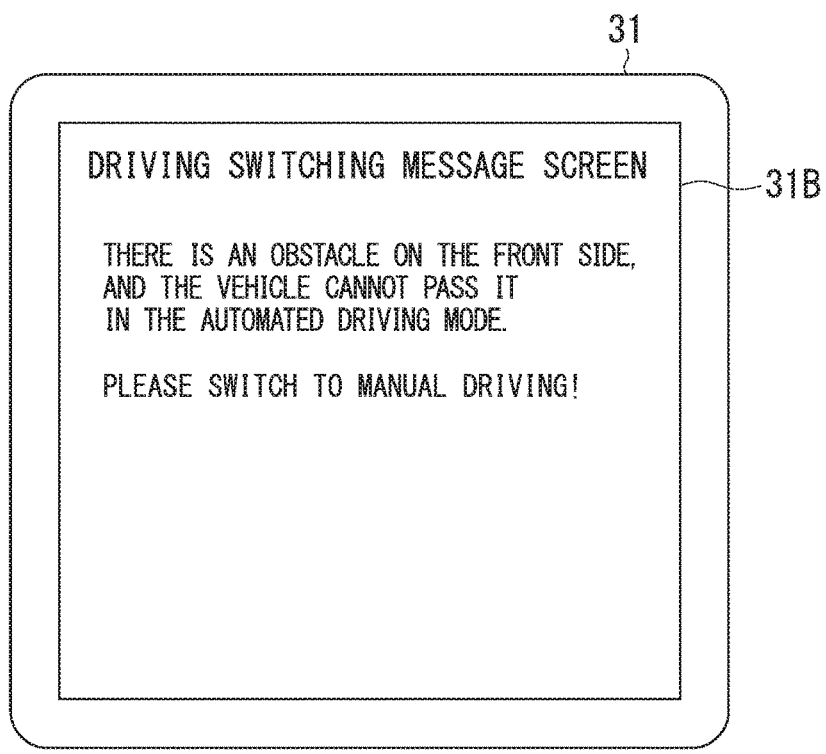
FIG. 14 is a diagram illustrating one example of details presented to a vehicle occupant at the time of driving switching.

In addition, in a case in which it is determined by the passage/no-passage determiner 124 that the vehicle cannot pass through the obstacle, the action plan generator 123 may perform switching control of switching the driving mode of the vehicle M from automated driving to manual driving. In such a case, the interface controller 150 may present a message for switching to manual driving to a vehicle occupant using the HMI 30. FIG. 14 is a diagram illustrating one example of details presented to a vehicle occupant at the time of driving switching. In a case in which it is determined by the passage/no-passage determiner 124 that the vehicle cannot pass through the obstacle, the interface controller 150 causes the display device 31 of the HMI 30 to display a driving switching message screen 31B. As the driving switching message, for example, as illustrated in FIG. 14, a message "There is an obstacle on the front side, and the vehicle cannot pass it in the automated driving mode. Please switch to manual driving!" or the like may be output but is not limited thereto. In addition, the interface controller 150 may output a voice similar to the driving switching message from the speaker of the HMI 30. The interface controller 150 may remove the driving switching stopping message screen 31B after display for a predetermined time or may remove the urgent stopping message screen in a case in which there is an operation on the steering wheel, an operation on the acceleration pedal or the brake pedal, or the like from a vehicle occupant.

Process Flow

Figure 15:
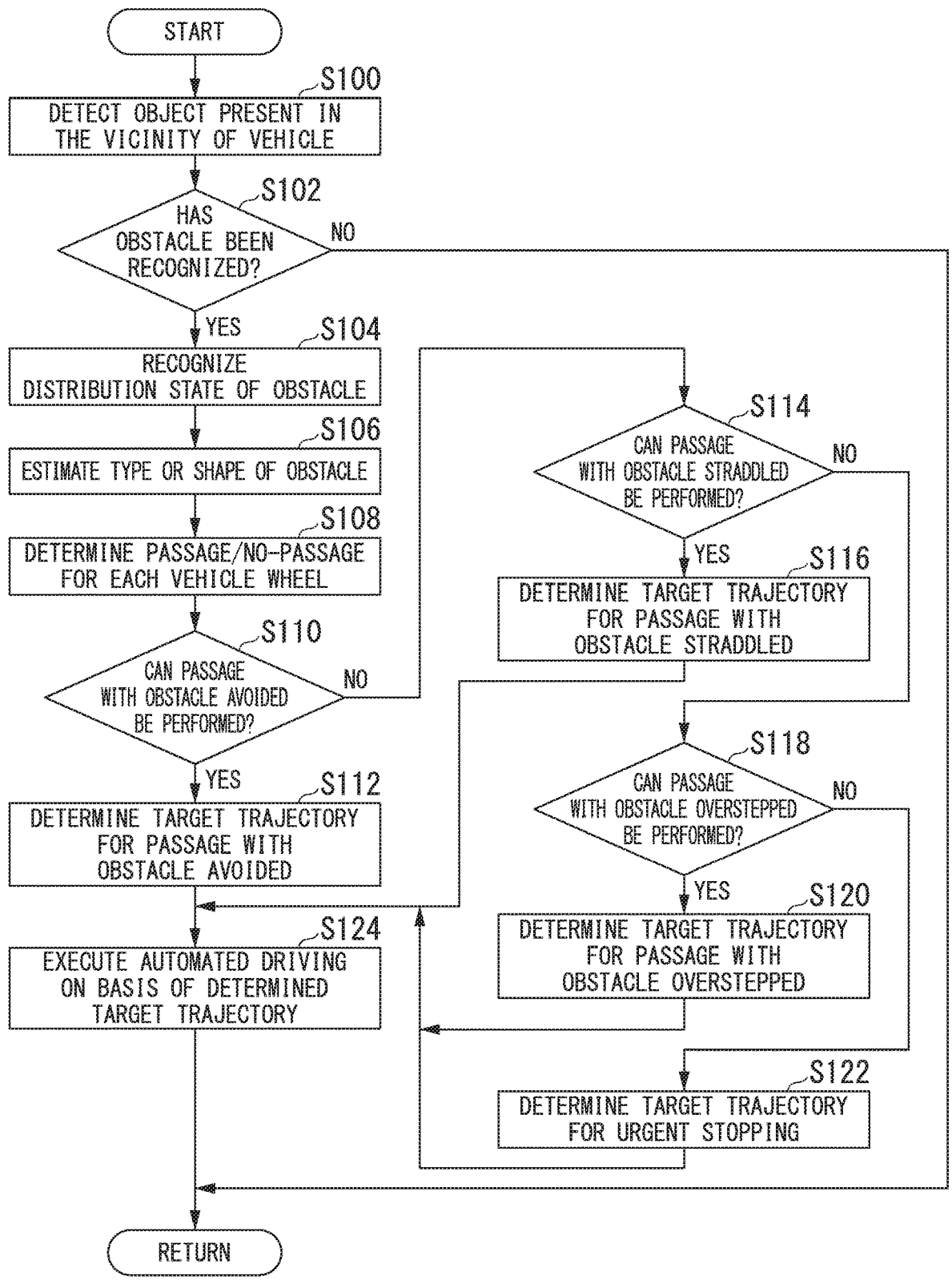
FIG. 15 is a flowchart illustrating one example of action plan generation according to an embodiment.

Hereinafter, one example of various vehicle control processes using the vehicle system 1 according to an embodiment will be described. FIG. 15 is a flowchart illustrating one example of action plan generation according to an embodiment. In addition, the process illustrated in FIG. 15 is repeatedly executed during the execution of automated driving. In addition, the process of FIG. 15 illustrates a process in which an action plan is changed in accordance with a predetermined condition in a state in which the action plan is generated on the basis of a destination set in advance, and automated driving is executed in accordance with the generated action plan.

First, the external system recognizer 121 detects objects present in the vicinity of the vehicle M (Step S100). Next, the obstacle recognizer 121A determines whether or not an obstacle has been recognized among the detected objects (Step S102). In a case in which the obstacle has been recognized, the obstacle recognizer 121A recognizes an obstacle N distribution state (Step S104). Next, the estimator 121B estimates a type or a shape of the obstacle (Step S106).

Next, the passage/no-passage determiner 124 determines passage/no-passage for each vehicle wheel of the vehicle M for the distribution state of the obstacle on the basis of the type or the shape of the obstacle that has been estimated and the information relating to the shape of the vehicle M (Step S108). The passage/no-passage determiner 124 determines whether or not passage with the obstacle avoided can be performed (Step S110). In a case in which it is determined that the passage with the obstacle avoided can be performed, the action plan generator 123 determines a target trajectory for the passage with the obstacle avoided (Step S112).

In addition, in a case in which the passage with the obstacle avoided cannot be performed, the passage/no-passage determiner 124 determines whether or not passage with the obstacle straddled can be performed (Step S114). In a case in which it is determined that the passage with the obstacle straddled can be performed, the action plan generator 123 determines a target trajectory for passage with the obstacle straddled (Step S116).

In addition, in a case in which the passage with the obstacle straddled cannot be performed, the passage/no-passage determiner 124 determines whether or not passage with the obstacle overstepped can be performed (Step S118). In a case in which it is determined that the passage with the obstacle overstepped can be performed, the action plan generator 123 generates a target trajectory for the passage with the obstacle overstepped (Step S120). In addition, in a case in which the passage with the obstacle overstepped cannot be performed, the action plan generator 123 determines a target trajectory for urgently stopping (Step S122). Next, the action plan generator 123 executes automated driving on the basis of the determined target trajectory (Step S124). In this way, the process of this flowchart ends. In addition, also in a case in which an obstacle cannot be recognized among detected objects in Step S102, the process of this flowchart ends.

MODIFIED EXAMPLE

In the embodiment described above, it is determined whether passage can be performed at a time point at which an obstacle is recognized, and a target trajectory is determined on the basis of a result of the determination. However, the present invention is not limited thereto. For example, the action plan generator 123 may store a running history in the storage 160 in advance and, in a case in which an obstacle is recognized, refers to the running history. Then, in the case of an obstacle for which it is determined that passage can be performed in the previous running, the action plan generator 123 may cause the vehicle M to run along the target trajectory based on the running history. Accordingly, for example, in a case in which the vehicle M runs on a road on which there are a plurality of cracks, it is not necessary to occasionally perform determination of passage/no-passage, and automated driving can be continued by efficiently determining a target trajectory.

According to the vehicle control system, the vehicle control method, and the vehicle control program according to the embodiment described above, the vehicle can continue automated driving while avoiding an obstacle. In addition, according to the embodiment, in a case in which an obstacle cannot be avoided, an obstacle is straddled or overstepped through estimation of a type and the like of the obstacle, and accordingly, the vehicle M can continue automated driving while securing the safety of a vehicle occupant.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST 1 vehicle system
10 camera
12 radar device
14 finder
16 object recognizing device
20 communication device
30 HMI
40 suspension device
42 suspension controller
50 navigation device
60 MPU
70 vehicle sensor
80 driving operator
90 vehicle indoor camera
100 automated driving controller
120 first controller
121 external system recognizer
121A obstacle recognizer
121B estimator
122 subject vehicle position recognizer
123 action plan generator
124 passage/no-passage determiner
140 second controller
141 running controller
150 interface controller
160 storage
M vehicle

What is claim is:

1. A vehicle control system comprising:
a recognizer that recognizes a distribution state of obstacles in an advancement direction of a vehicle;
a trajectory determiner that determines a target trajectory for each vehicle wheel of the vehicle on the basis of the distribution state of the obstacles recognized by the recognizer; and
an automated driving controller that executes automated driving of the vehicle along the target trajectory determined by the trajectory determiner.

2. The vehicle control system according to claim 1, wherein the trajectory determiner determines a target trajectory for each vehicle wheel of the vehicle within a lane in which the vehicle is currently running.

3. The vehicle control system according to claim 2, wherein, in a case in which the target trajectory for each vehicle wheel of the vehicle cannot be determined within the lane in which the vehicle is currently running, the trajectory determiner determines the target trajectory by allowing a deviation from the lane in which the vehicle is currently running.

4. The vehicle control system according to claim 1, further comprising an estimator that estimates types of obstacles recognized by the recognizer,
wherein the trajectory determiner determines the target trajectory for each vehicle wheel of the vehicle on the basis of the types of the obstacles estimated by the estimator.

5. The vehicle control system according to claim 1, wherein the automated driving controller performs control of stopping the vehicle in a case in which the target trajectory for each vehicle wheel of the vehicle cannot be determined on the basis of a predetermined criterion by the trajectory determiner.

6. The vehicle control system according to claim 1, wherein the automated driving controller performs control of switching to manual driving according to a vehicle occupant of the vehicle in a case in which the target trajectory for each vehicle wheel of the vehicle cannot be determined on the basis of a predetermined criterion by the trajectory determiner.

7. A vehicle control method using an in-vehicle computer comprising:
recognizing a distribution state of obstacles in an advancement direction of a vehicle;
determining a target trajectory for each vehicle wheel of the vehicle on the basis of the recognized distribution state of the obstacles; and
executing automated driving of the vehicle along the determined target trajectory.

8. A non-transitory computer-readable storage medium that stores a vehicle control program to be executed by an in-vehicle computer to perform at least:
recognizing a distribution state of obstacles in an advancement direction of a vehicle;
determining a target trajectory for each vehicle wheel of the vehicle on the basis of the recognized distribution state of the obstacles; and
executing automated driving of the vehicle along the determined target trajectory.

* * * * *